E. J. HUNT.
CAMERA SHUTTER CONTROL.
APPLICATION FILED NOV. 25, 1916.

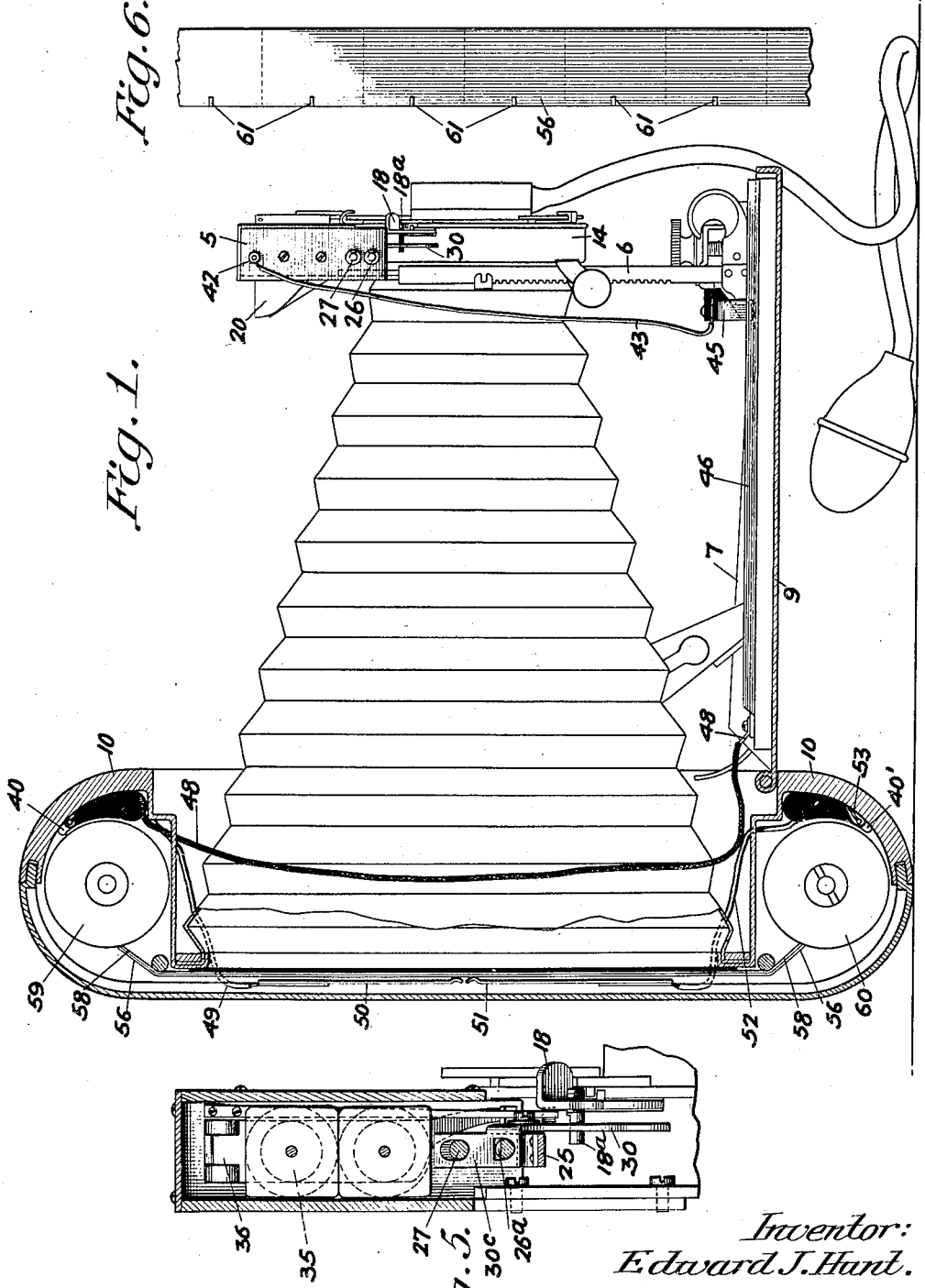
E. J. HUNT.
CAMERA SHUTTER CONTROL.
APPLICATION FILED NOV. 25, 1916.
1,254,503.
Patented Jan. 22, 1918.
3 SHEETS—SHEET 1.
Inventor:
Edward J. Hunt.
by Eugene C. Brown
Attorney

1,254,503.

Patented Jan. 22, 1918.
3 SHEETS—SHEET 2.

Inventor:
Edward J. Hunt.
by Eugene C. Brown
Attorney

E. J. HUNT.
CAMERA SHUTTER CONTROL.
APPLICATION FILED NOV. 25, 1916.
1,254,503.
Patented Jan. 22, 1918.
3 SHEETS—SHEET 3.
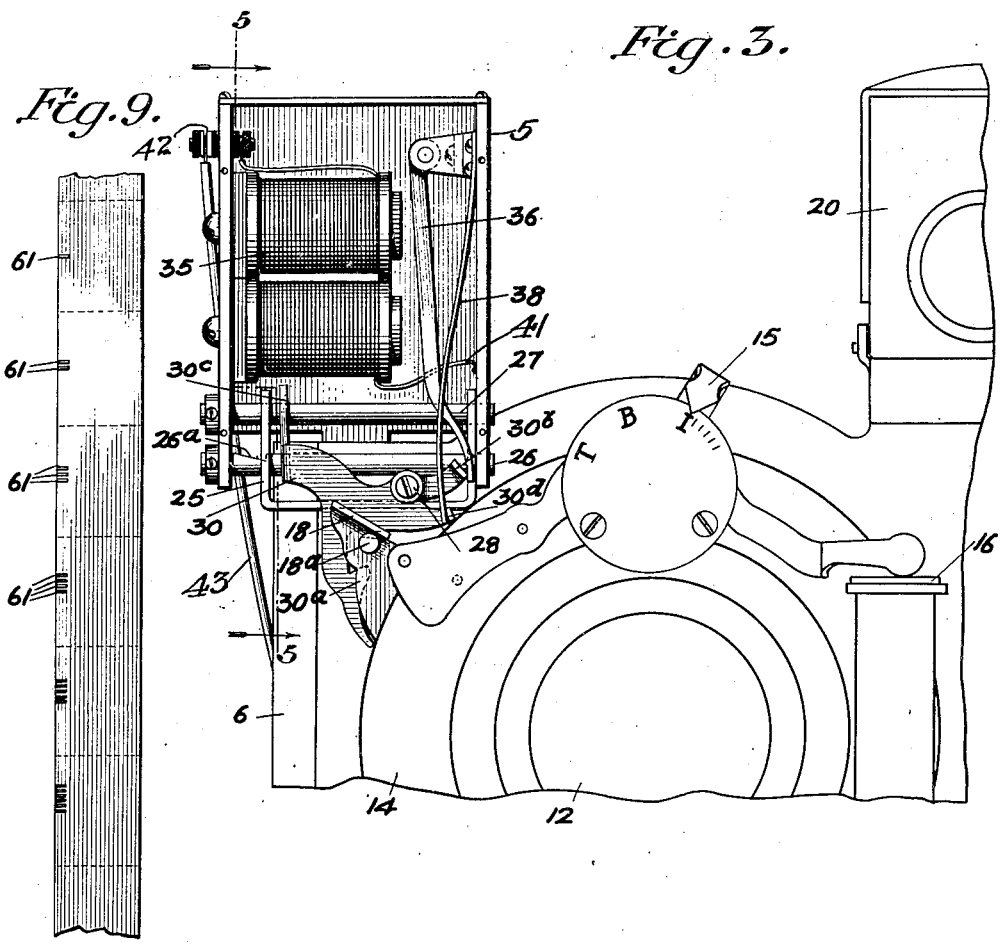
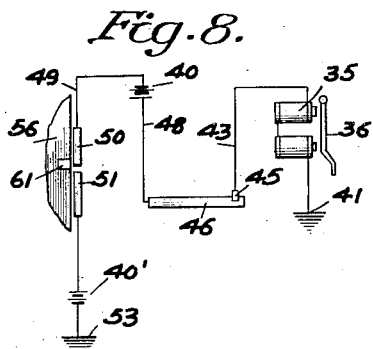
Inventor:
Edward J. Hunt.
by Eugene C. Brown
Attorney

UNITED STATES PATENT OFFICE.

EDWARD J. HUNT, OF WEST ORANGE, NEW JERSEY.

CAMERA-SHUTTER CONTROL.

1,254,503.

Specification of Letters Patent.  Patented Jan. 22, 1918.

Application filed November 25, 1916. Serial No. 133,405.

*To all whom it may concern:*

Be it known that I, EDWARD J. HUNT, a citizen of the United States, residing at West Orange, in the county of Essex and State of New Jersey, have invented certain new and useful Improvements in Camera-Shutter Controls, of which the following is a specification.

This invention relates to an improvement in cameras having as its main object to provide means for locking the shutter mechanism after each exposure until the film-feeding device has been operated, thereby preventing the possibility of a "double exposure" upon the same piece of film or plate.

As is known, the shutter of the camera is always set and is operated by depressing the shutter operating member. When it is desired to take another picture, the winding reel should be turned by the winding key until the exposed portion has been wound and another section has been brought into position, this operation being repeated for each picture or exposure.

It has been proposed to place the shutter actuating mechanism under the control of the film feeding device by mechanical connections. Such contrivances are more or less cumbersome, by reason of the necessary levers, flexible shafts, etc., and are rather complicated. I have devised a shutter operating mechanism in which the control is effected through electrical connections, the shutter locking device being actuated electromagnetically and the moving parts being reduced to a minimum.

Figure 4:
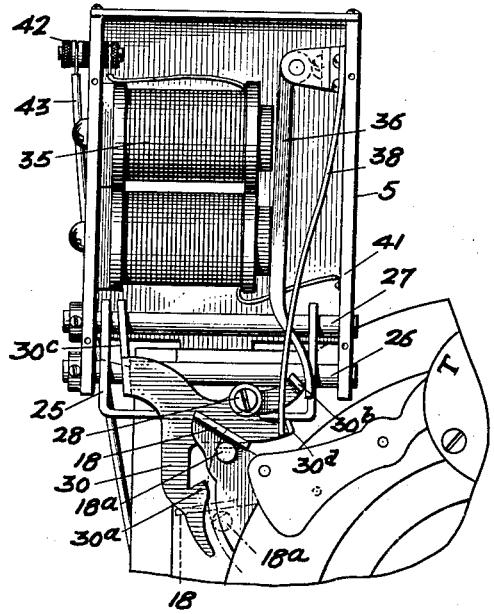
Figure 2:
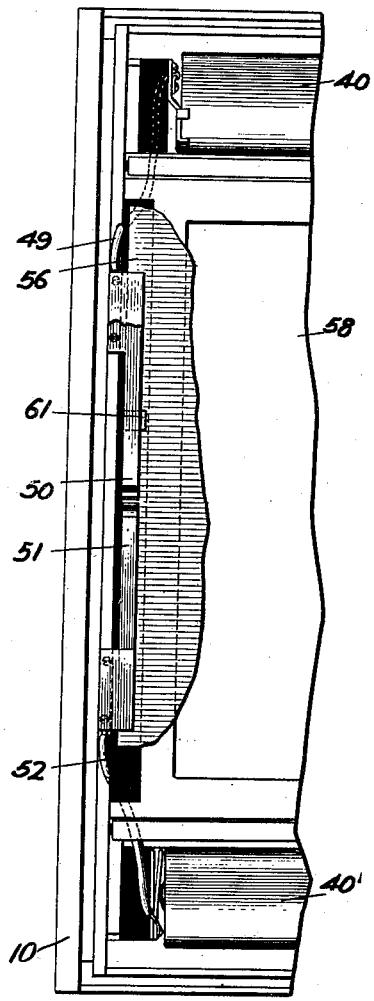
Figure 7:
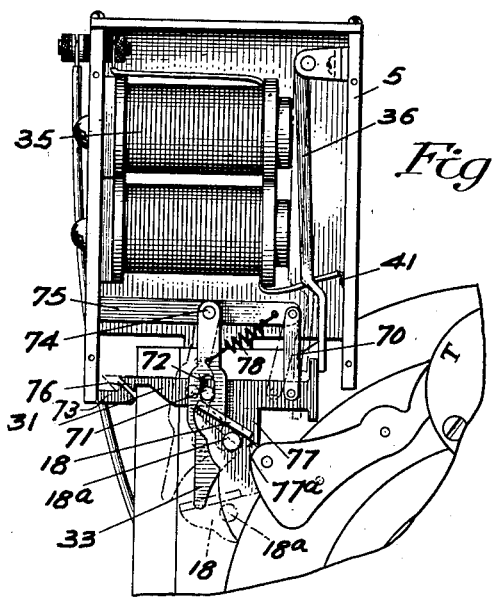

I shall describe my invention in connection with the accompanying drawings, in which—Figure 1 is a side, partly in section, of a camera showing my shutter control mechanism applied thereto; Fig. 2 is a fragmentary rear elevation of the same with the back member or lid removed and certain parts partly broken away; Fig. 3 is a partial front elevation of a lens and shutter mechanism with my locking device attached, the parts being enlarged to more clearly illustrate the operating parts; Fig. 4 is a similar view of the shutter locking device, showing the magnet energized to shift the parts into unlocked position so that the shutter operating member may be actuated in the usual manner; Fig. 5 is a vertical section on the line 5—5 of Fig. 3; Figs. 6 and 9 are plan views of sections of the film backing sheets with electrical contacts attached; Fig. 7 is a front elevation of a modified form of shutter locking device; and Fig. 8 is a diagrammatic illustration of the electrical circuits.

I have illustrated my shutter controlling mechanism applied to a folding hand camera of the well-known type, but it will be understood that it can be applied to any of the other types, whether used with plates, film rolls or film packs, each of these forms being included in the term "sensitized sheet."

The shutter locking device 5, is secured to the head 6, which slides between the guides 7, on the foldable support or front 9 of the camera casing 10, and carries the lens 12, shutter casing 14 and shutter operating mechanism. The latter may be of the usual construction having a time exposure regulator controlled by the position of the pointer arm 15, and actuated either by means of a pneumatic plunger 16, or by manually depressing the shutter actuating lever 18.

For the purpose of locking the lever 18 in its depressed position after an exposure, I mount the locking device upon the head 6, upon the opposite side from the view-finder 20, and adjacent the lever. A yoke 25, slidably mounted upon the rods 26, 27 in the frame or casing 5, carries a pivot pin 28 upon which is mounted the swinging latch member 30.

When the parts are in the position shown in Fig. 3, the lever 18, connected with the shutter actuating mechanism is only permitted to move slightly until it is arrested and held by the lug or pin 18$^a$ entering the recess of the hook 30$^a$, thereby preventing the operation of the shutter.

When the magnet 35 is energized in the manner hereinafter described, the armature 36 is attracted and pushes against the lug 30$^b$ on the latch member 30 and moves yoke 25 and latch 30 into the position illustrated in Fig. 4, the upwardly extending arm 30$^c$ riding over into the notch 26$^a$ in the rod 26 to hold the parts in this "set" position. During this movement the spring 38 is placed under tension by the engagement of the lug 30$^d$.

When the parts are in the "set" position the shutter may be operated because the downward movement of the lever 18, merely causes the pin or lug 18ᵃ to strike against the outside of the hook 30ᵃ and in a manner to oscillate it slightly, the pin passing down below the hook in an arcuate path indicated in dotted lines in Fig. 4. As the lever 18 moves upward upon its return stroke during the closing movement of the shutter, the pin 18ᵃ strikes the hook 30ᵃ an upward blow in the direction to lift the latch 30 until the arm 30ᶜ moves out of the notch 26ᵃ; whereupon the pressure of the spring 38 upon the lug 30ᵈ slides the yoke 25 and latch 30 back into the position shown in Fig. 3, thus bringing the hook 30ᵃ of the latch into the path of the pin 18ᵃ and preventing another movement of the shutter.

The dry batteries which supply the electric energy to actuate the electromagnet 35 may conveniently be placed within the casing 10 at either or both ends along side of the film rolls. They may be the small pencil-shaped casings in which two or more cells are connected end to end such as are now used in small pocket flash lamps. I prefer, however, to make these cells of a flattened shape such as illustrated at 40 40' in Fig. 1 so that they will conform to the usual space between the film roll and the adjacent inner wall of the casing.

One side of the magnet 35 is grounded to the frame at 41. The other side is connected by binding post 42 to a conductor 43 which connects with a contact shoe 45 carried by and insulated from the base of the sliding head 6. This shoe 45 maintains a sliding contact with an insulated bar 46 secured to the folding cover or support 9, the rear end of the conductor bar 46 being connected by a conductor 48 with one pole of the battery 40, the opposite pole being connected by conductor 49 with a spring contact arm 50 which is separated slightly from contact arm 51, the latter being connected by a conductor 52 with one pole of the battery 40', the opposite pole of which is grounded to the metal casing 10, as indicated at 53. It is evident that the only break in the electrical circuit just described is the gap between the adjacent ends of the spring contact arms 50, 51, this circuit being indicated diagrammatically in Fig. 8. These arms are secured to and insulated from a frame member forming the support for the film rolls and the free ends of the arms project into the path of the backing sheet 56 which travels with the film 58 as the latter has wound from one spool 59 to the other spool 60 in the usual manner.

At definite intervals corresponding to the length of each exposure portion of the film, I secure to the backing sheet small conducting bodies, such as metal foil as indicated at 61 on the backing sheet illustrated in Fig. 6. It is evident that the electric circuit above described will be closed whenever one of the pieces of metal film 61 bridges the gap between the adjacent ends of the contact arms 50, 51 and the electromagnet 35 will be energized. If the yoke 25 and the latch member 30 carried thereby are in the locking position shown in Fig. 3, they will be shifted by the armature 36 into the unlocked or "set" position shown in Fig. 4 and this will be repeated every time one of the conducting pieces 61 bridges the gap between the contact strips.

The operation of my shutter controller will be apparent from the detailed description above set forth. When the folding front or bellows support 9 is swung outwardly into the position shown in Fig. 1, the contact shoe 45 will be brought into engagement with the conductor bar 46 as the head standard 6 is moved outwardly between the usual guides 7 and will maintain electrical contact as the bellows is moved into focusing position. If an exposure has previously been made and the spool 60 has not been turned to wind the exposed film portion thereon and bring a new film section into position, the parts of the shutter controller will be in the position shown in Fig. 3. If, therefore, the operator should attempt to make another exposure upon the same film portion, the shutter lever 18 will be prevented from making the necessary movement because the pin 18ᵃ will engage the latch 30ᵃ and be prevented from further downward movement so that the shutter mechanism will not operate. This will indicate to the operator that the film spool was not rewound after the previous exposure. Accordingly he will turn the spool 60 in the usual manner to bring a new film section into position and in doing so will cause the corresponding metal foil piece 61 to pass beneath and momentarily bridge the gap between the arms 50, 51, thereby closing the electrical circuit and energize the magnet 35; whereupon the armature 36 will move the yoke 25 and latch member 30 from the locked position into the unlocked or "set" position shown in Fig. 4. The operator will then be enabled to make another exposure in the usual manner. My shutter controller operates, therefore, as a complete protection against the possibility of making more than one exposure upon the same film section.

Under certain circumstances, it is desirable for the operator to know how many exposures have been made and it is not convenient or possible to see the indicating numeral on the backing sheet through the side aperture or window usually provided for this purpose. I may provide an audible indication by arranging the metal foil contact strips 61 in a series of separate portions increasing by one step corresponding to the successive film sections, as illustrated in Fig. 9 so that the magnet will be energized a number of times corresponding to the number of the film exposure and the operator will be apprised of the number of the film section by the number of clicks of the armature against the magnet poles.

I have illustrated in Fig. 7 a modified form of the shutter locking device. The lock setting member 31 is pivoted at one end to a swinging link 70 and is supported at an intermediate point by a pin 71 which is permitted a limited travel within the elongated slot 72 in the swinging hook member 33 which is pivoted at 74 to the support 75. The free end of the member 31 is provided with a hook 73 which is adapted to ride over and engage the stationary hook 76. The member 30' is also provided with a depending portion 77 having a lower inclined edge 77$^a$ against which the pin 18$^a$ is adapted to strike upon its upward return stroke. A spring 78 tends to normally hold the parts in the position shown in Fig. 7.

The operation of this modification will be understood from the above description of the several parts. When the parts are as shown, the lever 18 of the shutter actuating mechanism will be locked and prevented from movement by the hook 33 which engages the pin 18$^a$. When the electrical circuit is closed by one of the metal pieces 61 on the film backing sheet bridging the gap between the contact arms 50, 51 in the manner previously described, the armature 36 will push the lock setting member 31 toward the left causing the hook on the free end thereof to ride over and engage the hook 76, thus locking the parts in the dotted line position so that the latch member 33 is out of the path of travel of the pin 18$^a$. The shutter actuating mechanism may therefore be operated, causing the lever 18 to swing downwardly into the dotted line position. The upward return movement of the lever 18 causes the pin 18$^a$ to strike the inclined lower edge 77$^a$ of the depending portion 77 in a manner to swing the hook end of the member 31 upwardly and disengage said hook from the stationary hook 76; whereupon the spring 78 will swing the parts back into the locking position indicated by the full lines.

The advantages derived from my invention will be appreciated by photographers who have experienced the annoyance and frequently the serious inconvenience resulting from a failure to wind the film after having made an exposure and afterward finding that a plurality of exposures have been made upon the same film section. I have overcome the objections to previous devices intended to prevent double exposures by eliminating the necessity of using any moving parts to connect the film-winding mechanism with the shutter locking device. The apparatus is more compact since the path for the electric current requires only an exceedingly small conductor which can be arranged in any convenient manner within the spaces that are unoccupied by the usual parts of the camera and moreover my invention can be easily applied to any form of existing commercial cameras. Again the electromagnetic actuating mechanism for the locking device can be made of exceedingly simple design and with very few moving parts. For these reasons my invention will be recognized as a very important improvement in this art.

While I have illustrated two forms of the locking device, it will be understood that I am not confined in any manner to such constructions as many different forms and modifications will occur to engineers which will come within the scope of my claims and without departing from my invention. The manner of applying this invention to other types of cameras will be apparent without further illustration. Other modifications within the scope of my invention will occur to those who appreciate my present disclosure.

I claim:—

1. An apparatus to prevent double exposure with a photographic camera, comprising means to lock the shutter-lever, including a stop member adapted to project into the path of the lever, and electro-magnetic means for withdrawing said member from the path of the lever, an electric battery carried by the camera, conductors connecting said battery and said electro-magnetic means but having a normally open gap adjacent the sensitized sheet, and means actuated by the movement of said sheet into exposing position to cause the closure of said gap.

2. An apparatus to prevent double exposure with a photographic camera, comprising means to lock the shutter-lever carried by the movable shutter support and including a stop member adapted to project into the path of the lever, and electro-magnetic means for withdrawing said member from the path of the lever, an electric battery located within the camera box or casing, conductors connecting said battery and said electro-magnetic means but having a normally open gap adjacent the sensitized sheet, and conducting strips carried by the support for the sensitized sheet to close said gap as the sheet is moved into exposing position.

3. An apparatus to prevent double exposure with a photographic camera, comprising a stop normally preventing movement of the shutter actuating mechanism, an electro-magnetic device to withdraw said stop, means to hold said stop in its withdrawn position, means connected with said mechanism to release said holding means, an electric battery adapted to energize said electromagnetic device, and means actuated by the movement of the sensitized sheet into exposing position to connect said device with the battery.

In testimony whereof I affix my signature in the presence of two witnesses.

EDWARD J. HUNT.

Witnesses:
  HELEN WIENER,
  MAE C. LOIHLE.